US007058079B1

(12) United States Patent
Gicquel et al.

(10) Patent No.: US 7,058,079 B1
(45) Date of Patent: Jun. 6, 2006

(54) METHOD FOR MAKING A CALL IN A MULTIPLE BIT-RATE TRANSMISSION CHANNEL BIT-RATE SWITCHING METHOD, CORRESPONDING NETWORK SECTION AND TRANSMISSION NETWORK

(75) Inventors: Serge Gicquel, IIe Grande (FR); Philippe Hamet, Trebeurden (FR); Marie-Joelle Pasche, Minihy Treguier (FR); Roland Soulabail, Servel (FR); Sylvain Weyl, Lannion (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/959,296

(22) PCT Filed: Mar. 29, 2000

(86) PCT No.: PCT/EP00/02760

§ 371 (c)(1),
(2), (4) Date: Apr. 10, 2002

(87) PCT Pub. No.: WO00/65866

PCT Pub. Date: Nov. 2, 2000

(30) Foreign Application Priority Data

Apr. 26, 1999 (EP) .................................. 99460029

(51) Int. Cl.
*H04J 3/16* (2006.01)
(52) U.S. Cl. ...................... 370/465; 370/329; 370/341; 370/348; 370/437
(58) Field of Classification Search ............. 370/395.2, 370/329, 348, 341, 465, 437; 375/222, 225
See application file for complete search history.

(56) References Cited

U.S. PATENT DOCUMENTS

| 4,943,973 | A | | 7/1990 | Werner ........................... 375/1 |
| 5,787,116 | A | | 7/1998 | Lam et al. .................... 375/222 |
| 6,128,282 | A | * | 10/2000 | Liebetreu et al. ............ 370/235 |
| 6,178,182 | B1 | * | 1/2001 | Blitz et al. ................... 370/477 |
| 6,507,591 | B1 | * | 1/2003 | Bray ............................. 370/501 |
| 6,636,525 | B1 | * | 10/2003 | Davis ........................... 370/437 |
| 6,810,029 | B1 | * | 10/2004 | Ozluturk ...................... 370/329 |
| 6,859,470 | B1 | * | 2/2005 | Fu et al. ........................ 372/34 |
| 2002/0136175 | A1 | * | 9/2002 | Ozluturk ...................... 370/329 |

FOREIGN PATENT DOCUMENTS

| EP | 0860967 A1 | 8/1998 |
| GB | 2242336 A | 9/1991 |

* cited by examiner

*Primary Examiner*—Kenneth Vanderpuye
*Assistant Examiner*—Jay P. Patel

(57) ABSTRACT

The invention relates to a method of setting up a call between a central module (33) and a remote module (37) of the type comprising at least one first transmission channel and one second transmission channel according to distinct primary and secondary bit rates respectively. According to the invention, the method comprises the steps setting up a call by default on the first channel; listening and searching for a signal indicating a secondary bit-rate requirement, assuming a detection of the signal indicating a secondary bit-rate requirement, a phase for the switching of a bit rate from the first primary bit-rate transmission channel to the secondary bit-rate transmission channel, associated with a step for the masking, during a predetermined masking period, of an acknowledgement signal sent during the default setting-up phase. The invention also concerns a corresponding switching method, transmission network section and transmission network.

25 Claims, 5 Drawing Sheets

METHOD FOR MAKING A CALL IN A MULTIPLE BIT-RATE TRANSMISSION CHANNEL BIT-RATE SWITCHING METHOD, CORRESPONDING NETWORK SECTION AND TRANSMISSION NETWORK

FIELD OF THE INVENTION

The field of the invention is that of methods for the transmission of telephone calls in multiple bit-rate transmission channels.

The invention can be applied notably to the case of multiple bit-rate links from a central station, through peripheral stations of a network in a star or hub-and-spoke configuration, to terminal stations.

A network of this kind corresponds for example to <<rural>> telephony infrastructures, typical in regions that are under-equipped in wire or cabled networks and/or have a low density of potential subscribers.

Typically, a subscriber is therefore connected through the setting up of a first communications section from the central station to the peripheral station to which he is attached and then of a second section from the peripheral station to the terminal station of the subscriber.

Now, in certain configurations of a network such as this, the modalities of transmission are not the same in the first and second sections. Thus, the link from the central station to the peripheral station may correspond to a TDMA (Time Division Multiple Access) type of communication whereas the second section might use a different standard such as for example the DECT (Digital European Cordless Telephone) standard or any other radiocommunications standard with the mobile phones (or any other standard).

A network of this kind, with a sequencing of heterogeneous sections, raises problems of management in certain situations.

This is the case for example when a terminal involved in a call using a network of this kind may request different bit-rate resources depending on whether for example it is seeking to establish either a simple voice call or a transfer of data of the type requiring intervention by a modem (for example for a connection on an open network of the Internet type). In this case, a voice call will require a bit rate lower than that of a data transfer.

DESCRIPTION OF THE RELATED ART

A first known approach consists in routinely providing a bit rate capable of meeting the greatest need for resources. However, this approach leads to the under-exploitation of the transmission channel since, in the case of simple voice communications, for example, the bit rate allocated will be greater than the need.

A second approach consists of the use of a multiple bit-rate channel and the selective allocation of the most appropriate bit rate to each call. However, those skilled in the art are discouraged from using this technique because of the complexity of the existing bit-rate allocation procedures which are not compatible with the constraints of calls involving modems, notably in the initial critical stages of setting up calls and of negotiation between modems.

Indeed, a change in the bit rate of the allocated line as a function of need entails the implementation of bit-rate switching procedures to increase or reduce the allocated bit rate as required. However, a conventional switching of the transmission channel entails the risk that the bit-rate switching is not exactly simultaneous and synchronized in the two sections. The resulting disturbance is indeed such as to abort the procedure for setting up calls between modems and this risk cannot be tolerated in the context of a switching service that is expected to be reasonably reliable with a success rate of nearly 100% when calls are being set up.

The call procedure between two modems, one of which is with a multiple bit-rate telephone subscriber (calling or called subscriber), can be subdivided into four stages:
- the setting of the call according to a given bit rate (typically 32 kbit/s in the V25 standard for example);
- the connection of the two modems;
- the procedure for negotiating the transmission speed between the two modems;
- the transfer of the data elements.

According to the V25 recommendation, the modem connection phase can be sub-divided as follows:
- the calling modem, after taking the line and dialing the number, sends an uninterrupted call tone to the called modem;
- the called modem takes the call, gets connected to the line and, after a silence, sends the response tone constituted by a continuous signal at 2,100 Hz;
- as the case may be, the modems can deactivate network echo cancellers and/or suppressors devices, by making or not making phase reversals at regular intervals (typically every 450±25 ms), as specified in the G164 and G165 recommendations.
- the calling modem, after having recognized the answering tone, waits for reception of a silence of 75±25 ms coming from the called modem, and then goes into the negotiation phase. To accelerate the procedure, this calling modem can inform the called modem that it has recognized its reponse by sending it an acknowledgment signal of the calling modem: in recognizing this signal, the called modem stops sending the response tone and then, after 75+20 ms of silence, goes into the negotiation phase. When there is no acknowledgment signal from the calling modem, the called modem sends the response tone for a period of 3.3 s±0.7 s and then, after 75±20 ms of silence, goes into the negotiation phase.

To enable the modems to work with a minimum bit rate, the switching of the bit rate (namely the changing of the transmission channel) must be ended before the beginning of the procedure of negotiation between the modems.

This means that the following conditions should be met:
i—the response of the called modem should not be interrupted for a duration of more than 55 ms, otherwise the calling modem could go into the negotiation phase;
ii) the detection of the response tone must take place before the end of a period of time equal at most to 200 ms starting from the appearance of the response on the line as specified in the G165 recommendation. In general, the detection of the response tone must meet the V25, G164 and G165 recommendations;
iii) the response tone must be sent by the called modem for a period of time equal at least to 2.6 s starting from the appearance of the response tone on the line, as indicated in recommendation V25;
iv) the response tone should not be interrupted for a period of time equal to 100 ms;
v) if there should be no phase reversal whatsoever of the response tone (in this case only the echo suppressor devices of the transmission network will have to be deactivated), an absence of phase reversal such as this must be observed over a period of time equal at most to 475 ms starting from the detection of the response tone on the line;

vi) if there should be phase reversals of the response tone present (in this case the echo canceller and suppressor devices of the transmission network have to be deactivated), the presence of a first phase reversal must take place before the end of a period of time equal at most to 475 ms starting from the detection of the response tone on the line and the presence of a second phase reversal must also occur before the end of a period of time equal at most to 475 ms starting from the appearance of the first phase reversal of the response tone on the line as laid down in the G164 and G165 recommendations.

SUMMARY OF THE INVENTION

The invention belongs in particular to this context of constraints which may be contradictory.

It is a goal of the present invention to provide a method for setting up a call that makes it possible to optimize the allocation of resources.

Another goal of the invention is to provide a bit-rate allocation method of this kind that is compatible with the severe constraints laid down by the procedures for setting up calls between two modems.

It is also a goal of the invention to provide a bit-rate switching method that does not require the addition or processing of a piece, of information in addition to that presently available in standard procedures for setting up calls and is activated notably without any advance knowledge either of the nature of the transmission requested by the subscriber or, therefore, of the transmission bit-rate requirement necessitated by this subscriber's call.

The invention also has the goal of providing a solution that at least meets the situation where the modems seek to neutralize both the echo suppressors and the echo cancellers, during the initial connection phase when the bit-rate switching according to the invention comes into play.

These various goals as well as others that shall appear hereinafter are achieved according to the invention by means of a method for setting up a call with bit-rate allocation in a multiple bit-rate transmission channel enabling a call to be conveyed between a central module and a remote module, said multiple bit-rate transmission channel comprising at least one first transmission channel according to a primary bit rate and at least one second transmission channel according to a secondary bit rate that is distinct from said primary bit rate, said method being designed to be implemented notably to convey a call between a calling module and a called module, the call being set up according to a setting-up process comprising the following steps:

a first step of the sending of a call signal by said calling module;

a second step of the sending of a response signal by said called module;

a third optional step of the sending, by said calling module, of an signal of acknowledgment of said response signal;

a fourth step for the negotiation of transmission characteristics between said calling and called modules;

said method being characterized in that it comprises the following steps:

a phase for the setting up by default of said call on a first primary bit-rate transmission channel;

a phase of listening and searching for a signal indicating a secondary bit-rate requirement;

and, assuming a detection of said signal indicating a secondary bit-rate requirement, a phase for the switching of a bit rate from said first primary bit-rate transmission channel to said secondary bit-rate transmission channel, said bit-rate switching phase being associated with a step of the masking for a predetermined time period of said acknowledgment signal if to be sent.

The general principle of the invention therefore consists in carrying out a transmission channel switching operation designed to match the bit rate to requirements.

It must be noted that, according to the invention, there is always time available to carry out this switching which takes place during the transmission of the response signal and before the negotiation step.

Indeed, it is recalled that the sending of the acknowledgment signal, which is optional, is aimed at triggering of the negotiation step prematurely. The response signal is then sent during a reduced period instead of a maximum predetermined response duration. As a result, two situations may arise:

either the acknowledgment signal is not sent and the negotiation step is not triggered prematurely. In this case the response signal is sent for the maximum response duration which is sufficient for the bit-rate switching to be done;

or the acknowledgment signal is sent and the negotiation step has to be triggered prematurely. In this case, the acknowledgment signal is masked in order that the response signal may be sent, all the same, for the maximum response duration. Thus, because of the masking, the operation returns to the above-mentioned situation: the negotiation step is not activated prematurely and there is therefore enough time to do the switching.

Owing to the passage, following this switching, from a first transmission channel to a second transmission channel, optimum use is made of the available transmission resources to exchange data elements between the called module and the calling module.

Preferably, said response signal is sent by said called module during a predetermined maximum response duration, before said fourth negotiation step is undertaken, the acknowledgment signal if sent, prematurely triggering said fourth negotiation step. Then, said masking step inhibits said premature triggering of said fourth negotiation step.

In a preferred embodiment of the invention, said central module and said remote module each cooperate with at least one modem, and said step for the sending, by said called module, of said response signal is carried out by one of said modems.

Advantageously, the characteristics of said response signal of one of said modems indicate said secondary bit-rate requirement. In other words, the signal indicating the secondary bit-rate requirement is identified with the response signal sent by the called modem, in such a way that the invention uses an already existing signal and therefore requires no new specific additional signal.

Preferably, should said response signal sent by said called module be capable of conveying information indicating an increased potential bit-rate capacity, in the form of regular phase reversals of said response signal, then the duration of said predetermined masking period preferably covers at least two phase reversals of said response signal, and the method comprises a step of detection of a first phase reversal of said response signal and a step of detection of at least one second phase reversal of said response signal sent by the called module, said steps of detection of said first and second phase reversals of said response signal conditioning:

either the continuance of said bit-rate switching phase from said first primary bit-rate transmission channel to said secondary bit-rate transmission channel;

or the cancellation of said switching phase and the keeping of the call in said first primary bit-rate transmission channel in the event of an absence of detection of at least one of said first and second phase reversals of said response signal.

It will be noted that the failure of the bit-rate switching phase dictates the continued exchange of data on the first primary bit-rate transmission channel.

According to a preferred mode of implementation of the invention, the method comprises a step for the detection of an absence of said response signal and when an absence of said response signal for a duration that exceeds a first predetermined threshold is detected, before the detection of said second phase reversal of said response signal, then said switching phase is cancelled and the call is kept in said first primary bit-rate transmission channel.

Advantageously, said signal indicating a secondary bit-rate requirement consists of a first response tone at a first frequency of 2,100 Hz approximately.

Preferably, said acknowledgment signal consists of a second response tone at a second frequency distinct from said first frequency.

Advantageously, said masking step of said acknowledgment signal if to be sent is implemented within a transmission system comprising at least two sections called first and second sections.

The invention lays down no constraints whatsoever with regard to the number and nature of the sections contained in a transmission system. It will be noted however that the invention is particularly useful when the transmission system comprises at least two sections.

In a preferred embodiment of the invention, said first section belongs to a first transmission network according to a first standard and said second section belongs to a second transmission network according to a second standard that is distinct from said first standard.

In other words, the two sections have different natures. It will be noted however that the invention can be applied also to the case where the two sections are homogeneous, i.e. are of the same nature.

In a particular embodiment, said first standard is the TDMA standard, and said second standard is the DECT standard.

It is clear that the communication standard or standards used between the calling and called modules is not a restrictive characteristic.

Preferably, said switching phase comprises the following successive operations:

the first switching of said second section, from said first primary bit-rate transmission channel to said second secondary bit-rate transmission channel;

the synchronous second switching of the two ends of said first section from said first primary bit-rate transmission channel to said second secondary bit-rate transmission channel.

Thus, the switching phase does not disturb the normal exchange of data elements between the calling and called modules and therefore results in no loss of data.

It must be noted that there is no distinction, as regards the data sending and data reception channels, between the calling module and the called module. In other words, the first and second switching operations relate to the transmission channel as well as to the reception channel.

According to a preferred embodiment of the invention, said first and second switching operations imply elementary switching operations between the connection and call-routing modules, and said elementary switching operations imply interruptions of communication of a duration smaller than a second predetermined threshold.

In this way, the modems are prevented from prematurely interpreting one of these call interruptions as a signal indicating a passage to the fourth step of negotiation of the transmission characteristics between the calling module and the called module.

Advantageously, prior to said second switching operation, a step is carried out, in particular, for setting up a second transmission channel, at said secondary bit rate, parallel to said first transmission channel, according to said primary bit rate, within said first section, and said first switching operation is carried out directly within said second section.

In other words, within the first section, the first and second transmission channels coexist during a transient phase. On the contrary, within the second section, there is a passage from one channel to the other without any transient phase. Preferably, before said second switching operation, a synchronization signal is sent from the end of said first section that is closest to said second section to the other end of said first section, so that said first and second ends of said first section perform said second switching operation at the same instant.

A synchronization signal of this kind prevents any loss of data sent during the call during the commutation of the ends of the first section.

In a particular embodiment of the invention, said modems work according to the V25 recommendation.

According to a particular embodiment of the invention, said switching phase furthermore comprises a step for the deactivation of the echo suppressors and cancellers and said step of deactivation complies with the G164 and G165 recommendations.

Preferably, at least one of the following conditions is met:

said step for the detection of said response signal takes place before the end of a period of detection of said predetermined maximum response signal;

said step for the detection of a first phase reversal of said response signal takes place before the end of a period of detection of a first phase reversal of said predetermined maximum response signal;

said step of detection of a second phase reversal of said response signal takes place before the end of a period of detection of a second phase reversal of said predetermined response signal.

Preferably, said method complies with at least one of the following approximate temporal values:

said period of masking of said predetermined acknowledgment signal is equal to at most about 2.6 seconds starting from said sending of said response signal;

said period of detection of said predetermined response signal is equal to at most about 200 ms starting from said sending of said response signal;

said period of detection of said first phase reversal of said predetermined response signal is equal to at most about 675 ms, starting from said sending of said response signal;

said period of detection of said second phase reversal of said predetermined response signal is equal to at most about 475 ms starting from said detection of said first phase reversal of said response signal;

said first predetermined threshold is at most about 100 ms;

said second predetermined threshold is at most about 55 ms.

Advantageously, said secondary bit rate is higher than said primary bit rate.

It is evidently when the secondary bit rate is greater than the primary bit rate allocated by default to the call that the invention finds its preferred application in optimizing the allocation of available bit-rate resources.

According to a particular embodiment of the invention, said secondary bit rate is 64 kbit/s and said primary bit rate is 32 kbit/s.

According to a preferred embodiment of the invention, said central module consists of a central communications station managing the transfer of all the calls, said remote module is a terminal station and said central module and said remote module are connected through a peripheral module, said peripheral module being constituted by a peripheral communications station providing the interconnection and matching of the exchanged data, during calls between said first and second sections.

Advantageously, said method furthermore comprises at least some of the following steps:

the stopping of the transcoding of the data transmitted between said central module and said remote module from a PCM encoding technique to an ADPCM coding technique within said first section and/or said second section;

the unmasking of said acknowledgment signal sent by said calling module;

the releasing of the physical resources of said first primary bit-rate transmission channel connected to said first section and/or said second section.

The invention also relates to a switching method implementing the method for setting up a call as described here above.

The invention also relates to a transmission network section implementing the method for setting up a call as explained here above.

BRIEF DESCRIPTION OF THE DRAWINGS

Other features and advantages of the invention shall appear from the following description of a preferred embodiment of the invention, given as a simple non-restrictive illustration with reference to the appended drawings, of which.

DETAILED DESCRIPTION

The invention therefore relates to a method for setting up a call within a multiple bit-rate transmission channel between a central module and a remote module making it possible notably to automatically reallocate the optimum passband enabling the ongoing data communication operation or operations to be allowed through.

Hereinafter in the present description, we shall consider the case of a telephone transmission channel in which the central module and a remote module each cooperate with a modem. Furthermore it is assumed that a transmission system implementing the reversal includes two series-connected sections called first and second sections. The first section belongs to the first transmission network according to the TDMA standard while the second section belongs to a second transmission network according to the DECT standard. It is clear however that the invention can also be applied to cases where the sections belong to one and the same transmission network, whatever may be the number and/or whatever may be the nature of the sections included within the transmission system.

According to the particular embodiment of the invention presented here below, the method for setting up a call consists notably in switching each of the sections of the transmission system from a first transmission channel with a reduced bit rate to a second transmission channel with a higher bit rate. With a view to simplifying this description, hereinafter reference shall be made solely to the first and second transmission channels without recalling the type of associated bit rate. This switching is possible only from the time when the presence of a modem at a first end of the transmission channel, namely the end constituted by the called module, has been detected at the other end of the transmission channel, namely the end formed by the calling module.

Figure 1:
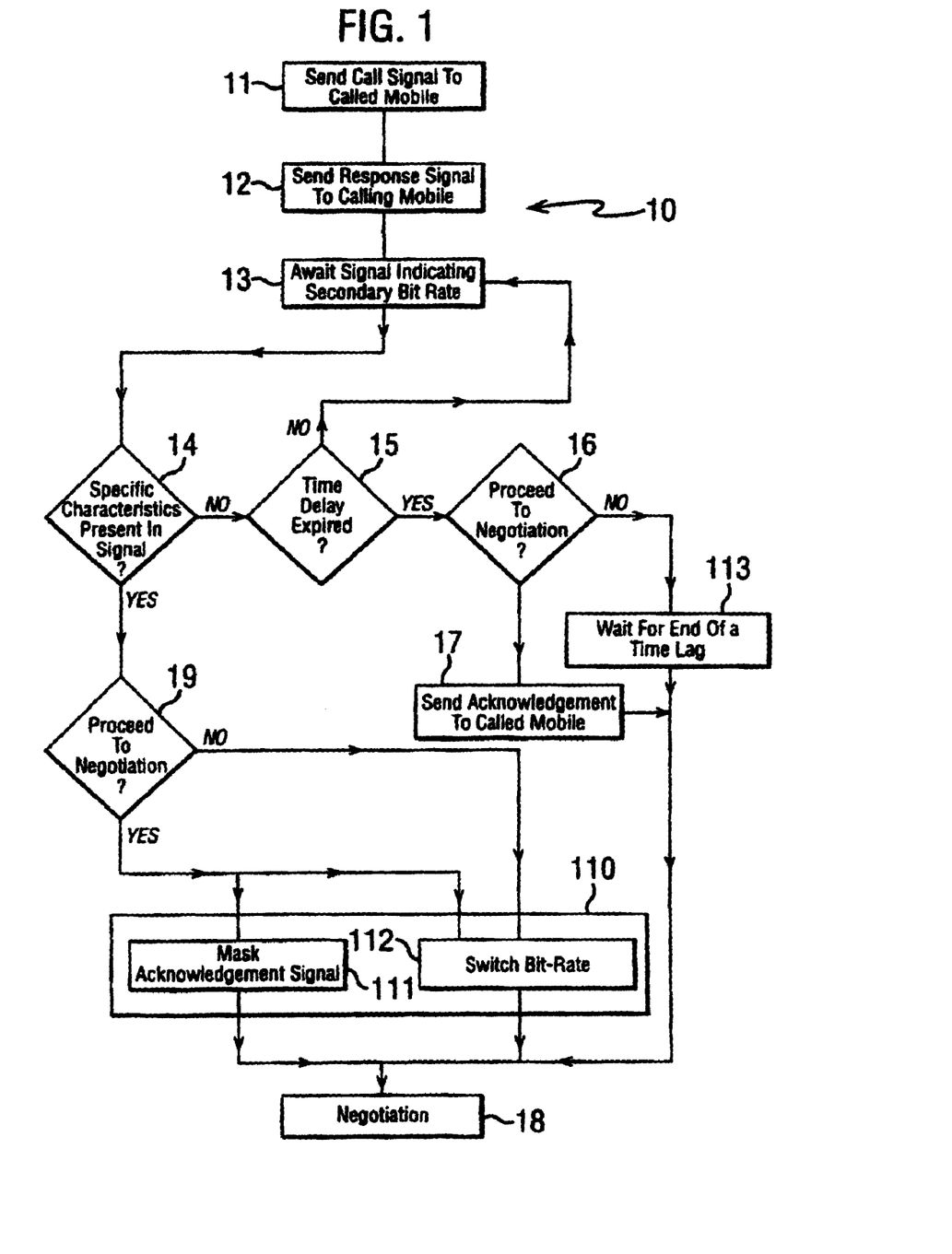
FIG. 1 shows a simplified flow chart of a particular mode of implementation of a method according to the invention for setting up a call with bit-rate allocation between a central module and a remote module.

With reference to FIG. 1, a description is now given of a particular embodiment of the method for setting up a call according to the invention.

Conventionally, the method discussed enables the setting up of a call, with the allocation of a transmission channel with a given bit rate in a multiple bit-rate transmission channel, between a central module and a remote module. As the case may be, one is the calling module and the other is the called module.

The method 10 for setting up a call comprises, also in a standard way, the following successive steps:

a first step 11 for the sending of a call signal by the calling module consists of the sending, to the called module, for example at a frequency of 1,200 Hz, of a call tone. This first sending step 11 is performed after a telephone subscriber, provided with the remote module, has taken the line and dialed a phone number. In this case, the called module takes the corresponding line;

a second step 12 for the sending of a response signal by the called module. During the second sending step 12, preceded by a silence having a predetermined duration, the called module sends a response tone consisting of a continuous signal, for example at 2,100 Hz, to the calling module. It is the detection of the presence of the response signal that makes it possible to know whether a modem is cooperating with the called module;

a third optional step 17 for the sending, by the calling module, of an acknowledgment signal for the response signal. This acknowledgment signal which has a frequency distinct from that of the response signal seeks to anticipate the activation of the following step;

a fourth step 18 for the negotiation of the characteristics of data transmission between the calling module and the called module such as, notably, the speed of transmission of the data between the calling modem and the called modem. The fourth negotiation step 18 can be carried out either after an acknowledgment of the acknowledgment signal by the called module or after a detection at the end of the sending of the response signal by the calling module.

According to the invention, the method 10 for setting up a call with bit-rate allocation comprises:

a phase for the setting up, by default, of the call on a first transmission channel whether the caller is the central module or the remote module;

a phase of listening and searching for a signal indicating a secondary bit-rate requirement. This phase is for example a step 13 for the cyclical scrutiny of the data elements sent on a predetermined transmission channel of the multiple bit-rate transmission channel on which the calling module awaits a signal having predetermined specific characteristics. The signal indicating the secondary bit-rate requirement is for example formed by the above-mentioned response tone at a first frequency of about 2,100 Hz and sent by the called module;

a step for the analysis (14) of the presence of the specific characteristics.

Assuming that the expected characteristics are not present, an analysis (15) is made to ascertain that a time lag, activated for example from the start of the sending of the response signal, has ended. If the time delay has not reached its end, the step 13 for the cyclical examination of the data elements is repeated.

If not, namely if the time lag has ended, then it is seen whether (16) it is desired to bring forward the passage to a fourth step 18 for the negotiation of characteristics of transmission between the calling module and the called module. If this is the case, i.e. namely when it is desired to bring forward the time of activation of the fourth negotiation step 18, an acknowledgment signal (17) is sent from the calling module to the called module. If it is not the case, there is a wait for the end (113) of a time lag, activated from the beginning of the sending of the response signal, before passing to the fourth negotiation step 18.

Assuming that these specific characteristics of the signal indicating the secondary bit-rate requirement are present, it is seen (19) whether it is desired to bring forward the appearance of the fourth negotiation step 18. If this is the case, i.e. if the sending, by the calling module, of the acknowledgment signal is required (16) the operation passes to a bit-rate switching phase 110 from the first to the second transmission channel. This switching phase 110 comprises notably a bit-rate switching step 112 proper (described in detail further below) as well as a step 111 for masking the acknowledgment signal during a predetermined masking period. The term a masking a) is understood to mean an inhibition. The step 111 for masking the acknowledgment signal is implemented so as to leave a period of time needed for the full accomplishment of the bit-rate switching step 112 proper. It is clear that, if there should be no provision for sending an acknowledgment signal, the bit-ate switching step 112 proper is implemented solely and directly.

Hereinafter, the fourth step 18 for negotiating transmission characteristics between the calling module and the called module will make it possible, for the call in progress, to exchange data according to a secondary bit rate.

Figure 2A:
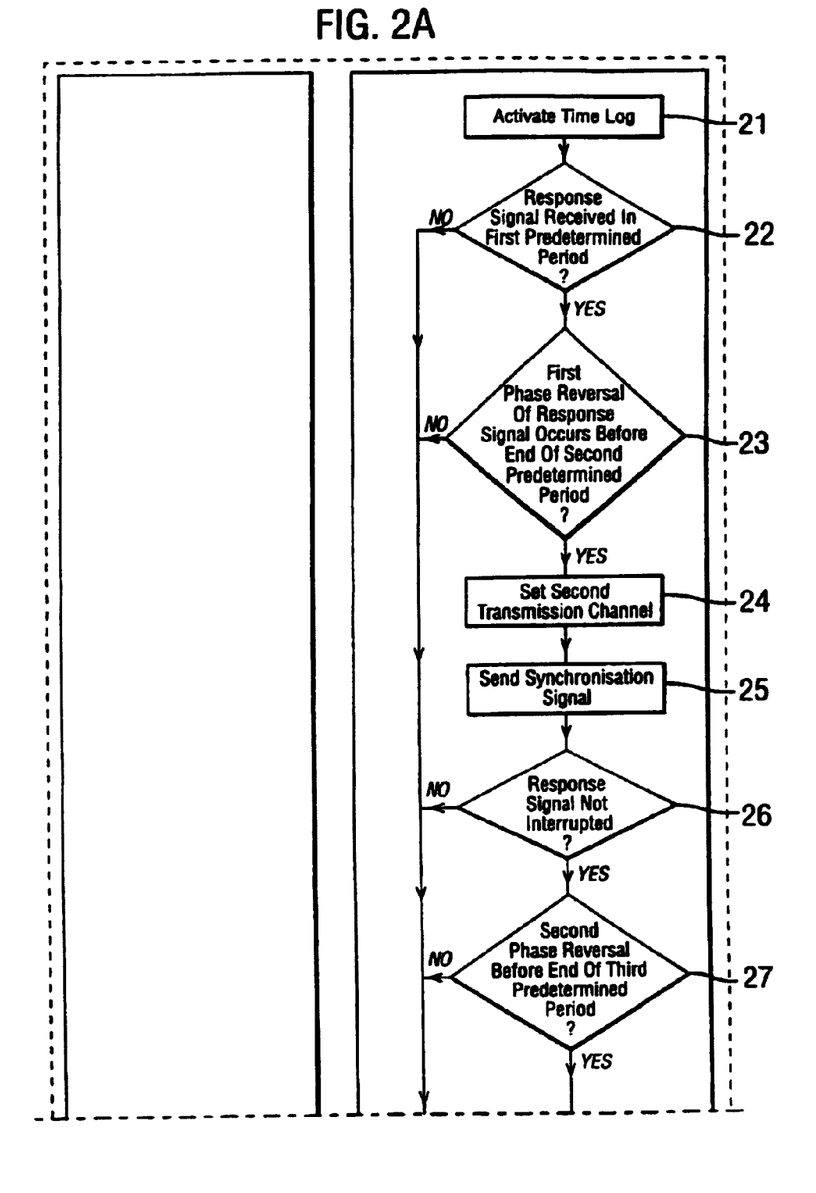
FIG. 2 illustrates a particular mode of implementation of the bit-rate switching phase shown in FIG. 1.
Figure 2B:
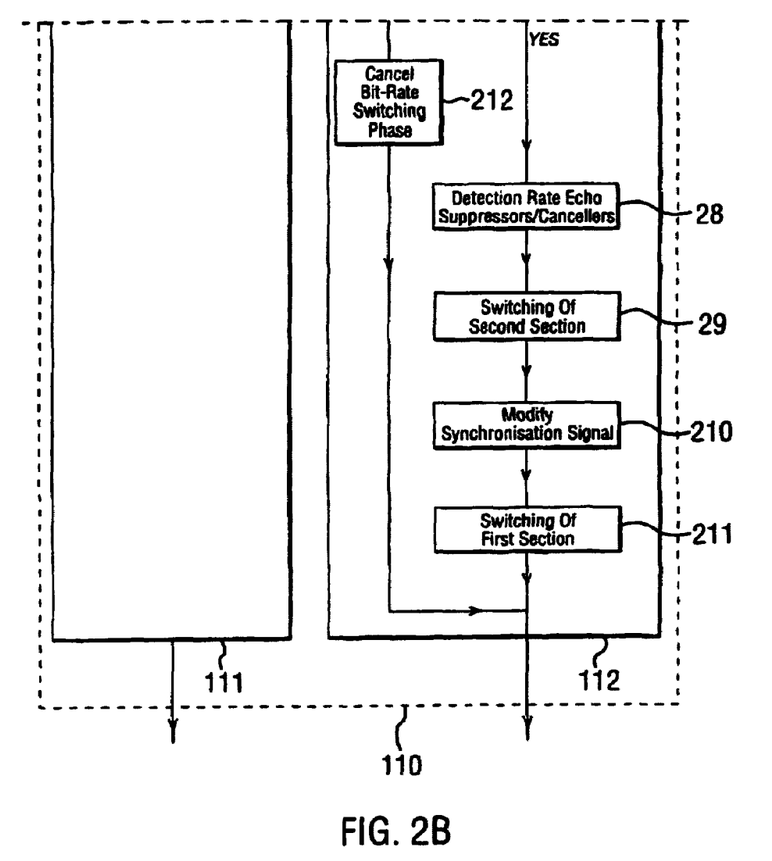

A description shall now be given, with reference to the simplified flow chart of FIG. 2, of a particular mode of implementation of the bit-ate switching phase 110 of the method explained here above.

We shall herein consider the case where the bit-rate switching phase 110 comprises a step for the deactivation of the echo suppressors and echo cancellers of the transmission system.

The bit-rate switching step 112 proper itself comprises the steps referenced 21 to 212 discussed here below.

First of all, a time lag is activated (21) starting from the time of transmission of the response signal by the called module so as to enable a basic time reference to be set up.

During a step 22, an analysis is made to ascertain that the response signal has occurred before the end of a first predetermined period starting from the point in time at which the response signal is sent. If this is the case, there is a passage to the next step 23.

During this step 23, it is ascertained that the first phase reversal of the response signal occurs before the end of a second predetermined period starting from the time at which the response signal is sent.

If the first phase reversal appears before the end of the second period, then a step 24 for setting up a second transmission channel is carried out. This step 24 makes it possible, within the first section, to set up a second parallel transmission channel parallel to the first transmission channel. Thus, the switching of the ends of the first section is prepared. To do so, the operation starts (25) with the sending of a synchronization signal, for example from the end of the first section that is closest to the second section to the end of the first section that is at the greatest distance from the second section. This synchronization signal is used to synchronize the switching of the first and second ends of the first section.

There is then a passage to a step 26 for the analysis of the presence of the response signal in order to ascertain that it is not interrupted during a period greater than a first predetermined threshold (100 ms according to the V25 recommendation). If an interruption of the response signal such as this is not detected, there is a passage to a step 27 for the detection of the second phase reversal.

During this step 27, it is ascertained that the second phase reversal is detected before the end of a third predetermined period starting from the time of the sending of the response signal.

It must be noted that the steps 23 and 27 for the detection of the first and second phase reversals condition the continuance of the bit-rate switching phase 110, from the first transmission channel to the second transmission channel.

If the second phase reversal appears before the end of the third period, then a step 28 is carried out for deactivating the echo suppressors and echo cancellers of the transmission system. This step 28 notably meets the recommendations G164 and G165.

With the echo suppressors and echo cancellers of the transmission system being deactivated, the switching (proper) from the first transmission channel to the second transmission channel is started.

During a first switching operation, 29, relating solely to the second section, a first switching operation is performed directly from the first switching operation to the second switching operation. In other words, at the same time and solely for the second section, the first transmission channel is released and the second transmission channel is allocated to the call.

Then, the synchronization signal is modified (210) (or according to one variant the sending of this signal is stopped) within the first section. In this way, the two ends of the first section know the predetermined instant at which they will have to accomplish a switching operation. Then, at this predetermined instant, the two ends of the first section simultaneously carry out (211) a second switching from the first transmission channel to the second transmission channel.

In order to enable all the (first and second) sections to carry out the necessary switching operations, the step 111 for masking the acknowledgment signal is extended notably until the switching of the last section has been performed. In other words, the duration of the masking period is extended notably until the second switching operation 211 has been performed.

When a failure occurs, there is an automatic passage to the step 212 for the cancelling the phase 110 for switching the bit rate holding the call, within the first and second sections, in the first transmission channel. In particular, the following situations of failure are known:

- the response signal has not been detected before the end of the first predetermined period, following the analysis step 2.2;
- the first phase reversal has not been detected before the end of the second predetermined period, following the analysis step 23;
- an absence has been detected of the response signal greater than the first predetermined threshold, following the analysis step 26;
- the second phase reversal has not been detected before the end of the third predetermined period, following the analysis step 27.

Figure 3:
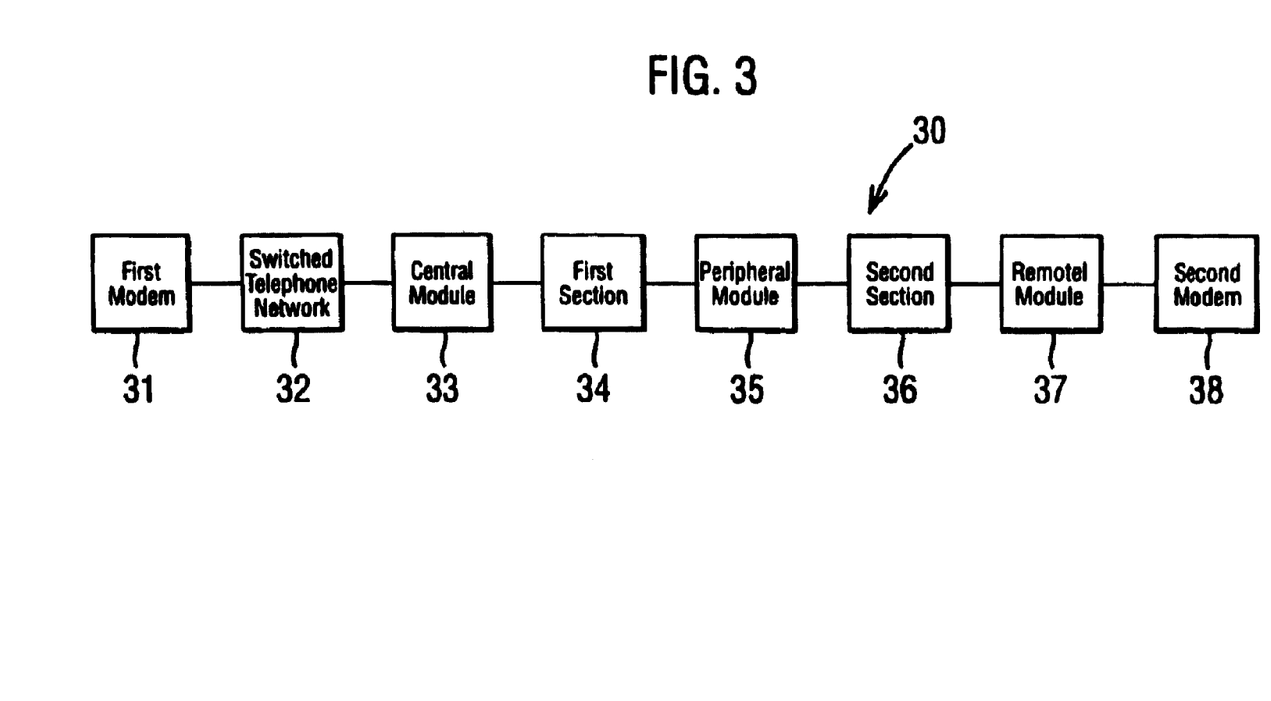
FIG. 3 is a simplified diagram of a particular embodiment of a transmission system comprising two sections, in which the method of FIG. 1 can be implemented.

As illustrated in the simplified diagram of FIG. 3, a transmission system 30 comprises the following means:

- a first modem 31 connected to
- a switched telephone network 32 connected to
- a module 33 called a central module connected to
- a first section 34 connected to
- a module 35 called a peripheral module connected to
- a second section 36 connected to
- a module 37, called a remote module, connected to
- a second modem 38.

The first and second modems 31, 38 work according to the V25 recommendation.

At least some of these means 31 to 38 include modules (not shown) for the connection and routing of the telephone calls.

It will be noted however that the invention lays down no constraint with regard to the number and/or nature of the connection and routing modules implemented.

The first switching operation 29 and the second switching operation 211 imply elementary operations notably for switching between the connection and call routing modules. These elementary switching operations themselves imply interruptions in calls of a duration smaller than a second predetermined threshold so as not to disturb notably the response signal (in which case the switching phase 110 might be abandoned). This second predetermined threshold is for example equal to about 55 ms in order to meet the recommendation V25.

The switched telephone network 32 is known per se and is therefore not described herein.

As for the central module 33, it is constituted by a central communications station that manages the transfer of the calls of the telephone transmission system 30 that need to be transferred.

With regard to the first section 34 and the second section 36, they may belong to distinct transmission networks. It will be noted that the invention lays down no constraint on the number and/or nature of the links set up within each of the first and second sections 34 and 36.

The peripheral module 35 is constituted for example by a peripheral communication station providing notably for the interconnection and matching of the data exchanged during calls between the first section 34 and second section 36.

In the present example, the primary and secondary bit rates are for example 32 kbits/s and 64 kbits/s respectively.

It is important to note that the switching phase 110 may be implemented for a call initiated by a telephone subscriber with a first modem 31 (in which case the central module 33 is the calling module and the called module is the remote module 37) as well as by a telephone subscriber equipped with a second modem 38 (in which case the called module is the central module 33 and the calling module is the remote module 37).

It is the characteristics of the response signal of one of the modems 31, 38 that indicate the bit-rate switching requirement and therefore launch the bit-rate switching phase 110.

Figure 4:
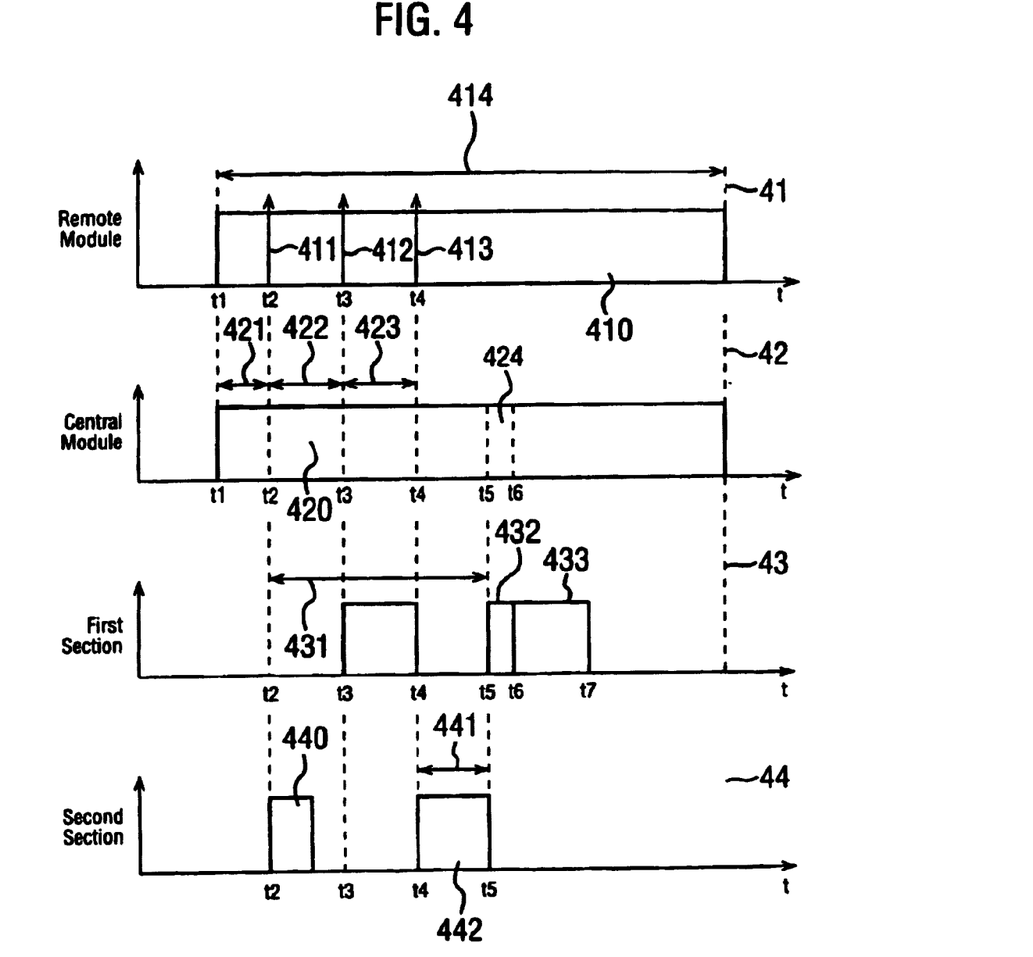
FIG. 4 shows simplified timing diagrams providing for an explanation respectively of the particular mode of implementation of the method of FIG. 1 applied within first and second sections of the transmission system of FIG. 3.

A description shall now be given, by means of the simplified timing diagrams of FIG. 4, of a particular mode of implementation of the switching phase 110.

It is assumed hereinafter that the calling module sends an acknowledgment signal so as to bring forward the appearance of the fourth step 18 of negotiation of transmission characteristics.

It is also assumed that the remote module 37 is the called module (and therefore that the central module 33 is the calling module).

Finally it is assumed that the response signal is the signal indicating a secondary bit-rate requirement.

Herein we shall consider the case where the echo suppressors and echo cancellers of the transmission system 30 have to be deactivated.

The four timing diagrams shown relate respectively to the remote module 37, the central module 33, the first section 34 and the second section 36.

It is assumed that the call between the central module 33 and the remote module 37 is set up beforehand on the first transmission channel.

At the instant t1, the remote module 37 starts sending a response signal to the central module 33 and simultaneously triggers a time lag.

The central module 33 (arrow referenced 411) detects the response signal at an instant t2 before the end of the first predetermined period 421 (equal to 200 ms at most starting from the instant t1). Starting from this instant $t_2$, the echo suppressors of the transmission system 30 are deactivated at 420 within the central module 33 and also at 440 within the first and second sections 34, 36. Also from this instant t2 onwards, the central module 33 sends the masking step 111 for masking the acknowledgment signal during a masking period 431. To carry out this masking step 111, the central module 33 sends a signal that is likened to a silence by the called module. The masking period is equal at most to 2.6 s starting from the instant t1, leaving a possible operational safety margin.

In this way, in the worst case, the response signal is sent by the remote module 37 for a period 414 equal at least to 2.6 s starting from the instant t1, in accordance with the recommendation V25.

Then, there is a wait for the detection of a first phase reversal (arrow referenced 412) occurring at an instant referenced t3, before the end of the second period (referenced 422) equal at most to 475 ms starting from the instant t2.

At the same time, namely starting from the instant $t_3$, a second transmission channel is allocated within the first section 34. Should the second transmission channel not be available within the first section 34, the switching phase 110 is aborted and the call on the first transmission channel is held (212) on the entire transmission system 30 (and therefore on the first section 34 and second section 36). It will be noted however that, in this case, there is provided an operation (described further below) for the unmasking of the acknowledgment signal.

With the first phase reversal 412 having been performed, the sending of a synchronization signal (during a period 441) is activated (25) on the second allocated transmission channel, from the end connecting the first section 34 to the peripheral module 35 to the end connecting the first section 34 to the central module 33. This synchronization signal enables both ends of the first section 34 to know the exact instant of their switching. It is constituted for example by a sequence of specific data elements detected within the end closest to the central module 33.

Then, the central module 33 waits for the appearance of a second phase reversal (arrow referenced 413) that takes place at an instant referenced t4 before the end of the third period 423 equal at most to 475 ms starting from the instant $t_3$.

Also from the instant t4, the second section 36 simultaneously and directly and dynamically (namely during the telephone call) carries out (442) a first switching 29 from the first transmission channel to the second transmission channel. Should the second transmission channel be unavailable within the second section 36, the switching phase 110 is canceled and the call is held (212) on the first transmission channel on the entire transmission system 30. It will be noted however that, in this case, an operation (described further below) is planned for the unmasking of the acknowledgment signal.

Starting from the instants t5 and t4 respectively, the central module 33 and the second section 36 perform (442) an operation to stop the transcoding, of the data transmitted between the central module 33 and the remote module 37, from a PCM (pulse coded modulation) technique to an ADPCM (adaptive differential pulse coded modulation) encoding technique.

Once the first switching operation 29 has been completed and the step 210 for modifying the synchronization signal has been performed (starting from the instant t5), the central module 33 initiates (424, 432) the synchronous commutation of the two ends of the first section 34, constituting the second switching operation 211.

The second transmission channel is then entirely set up and is therefore operational on the entire transmission system 30.

At the same time, namely at the instant t5, when the first switching operation 29 is completed, the central module 33 simultaneously lifts the masking of the acknowledgment signal. This unmasking consists for example in interrupting the sending of the signal likened to a silence by the called module.

Finally, when the second switching operation 211 is over, at an instant referenced t6, the first section 34 releases (433) the first transmission channel and therefore all the physical resources linked to this first transmission channel.

When the operations for releasing the physical resources have been performed, at an instant referenced t7, for the two sections 34, 36, it is possible to reutilize the means that have been implemented and again become available for another telephone call, if necessary, to be made with the central module 33.

The invention claimed is:

1. A method for setting up a call with bit-rate allocation in a multiple bit-rate transmission channel enabling a call to be conveyed between a central module (33) and a remote module (37), said multiple bit-rate transmission channel comprising at least one first transmission channel according to a primary bit rate and at least one second transmission channel according to a secondary bit rate that is distinct from said primary bit rate, said method being designed to be implemented notably to convey a call between a calling module and a called module, said call being set up according to a setting-up process comprising the following steps:
   a first step (11) for the sending of a call signal by said calling module;
   a second step (12) for the sending of a response signal by said called module;
   a third step for the sending, by said calling module, of a signal of acknowledgment of said response signal;
   a fourth step (18) for the negotiation of transmission characteristics between said calling and called modules;
said method further comprises the following steps:
   a phase for the setting up by default of said call on a first primary bit-rate transmission channel;
   a phase (13) of listening and searching for a signal indicating a secondary bit-rate requirement;
and, assuming a detection of said signal indicating a secondary bit-rate requirement,
   a phase (110) for the switching of a bit rate from said first primary bit-rate transmission channel to said secondary bit-rate transmission channel, said bit-rate switching phase (110) being associated with a step (111) of masking of said acknowledgement signal for a predetermined making period (431),
   wherein said response signal is sent by said called module during a predetermined maximum response duration (414), before said fourth negotiation step (18) is undertaken, the sending of said acknowledgement signal triggering said fourth negotiation step (18),
   characterized in that said masking step (111) inhibits said premature triggering of said fourth negotiation step (18).

2. A method according to claim 1, wherein said central module (33) and said remote module (37) each cooperate with at least one modem (31, 38), characterized in that said step (12) for the sending, by said called module, of said response signal is carried out by one of said modems (31, 38).

3. A method according to claim 2, characterized in that the characteristics of said response signal of one of said modems (31, 38) indicate said secondary bit-rate requirement.

4. A method according to claim 1, wherein said response signal sent by said called module is capable of conveying a piece of information indicating an increased potential bit-rate capacity, in the form of regular phase reversals of said response signal, characterized in that the duration of said predetermined masking period (431) preferably covers at least two phase reversals of said response signal, and in that it comprises a step (412) of detection of a first phase reversal of said response signal and a step (413) of detection of at least one second phase reversal of said response signal sent by the called module, said steps (412, 413) of detection of said first and second phase reversals of said response signal conditioning:

either the continuance of said bit-rate switching phase (110) from said first primary bit-rate transmission channel to said secondary bit-rate transmission channel;

or the cancellation of said switching phase (110) and the keeping of the call in said first primary bit-rate transmission channel in the event of an absence of detection of at least one of said first and second phase reversals of said response signal.

5. A method according to claim 4, characterized in that it comprises a step (26) for the detection of an absence of said response signal, and in that when an absence of said response signal for a duration that exceeds a first predetermined threshold is detected, before the detection of said second phase reversal of said response signal, then said switching phase (110) is cancelled and the call is kept in said first primary bit-rate transmission channel.

6. Previously amended) A method according to claim 1, characterized in that said signal indicating a secondary bit-rate requirement consists of a first response tone at a first frequency of 2,100 Hz approximately.

7. A method according to claim 6, characterized in that said acknowledgment signal consists of a second response tone at a second frequency distinct from said first frequency.

8. Previously amended) A method according to claim 1, characterized in that said masking step (111) of said acknowledgment signal is implemented within a transmission system (30) comprising at least two sections called first (34) and second (36) sections.

9. A method according to claim 8, characterized in that said first section (34) belongs to a first transmission network according to a first standard and in that said second section (36) belongs to a second transmission network according to a second standard that is distinct from said first standard.

10. A method according to claim 9, characterized in that said first standard is the TDMA standard, and said second standard is the DECT standard.

11. A method according to claim 8, characterized in that said switching phase (110) comprises the following successive operations:

the first switching (29) of said second section (36), from said first primary bit-rate transmission channel to said second secondary bit-rate transmission channel;

the synchronous second switching (211) of the two ends of said first section (34) from said first primary bit-rate transmission channel to said second secondary bit-rate transmission channel.

12. A method according to claim 11, wherein said first and second switching operations (29, 211) imply elementary switching operations between the connection and call-routing modules, characterized in that said elementary switching operations imply interruptions of communication of a duration smaller than a second predetermined threshold.

13. A method according to claim 11 characterized in that, prior to said second switching operation (211), a step is carried out, in particular, for setting up a second transmission channel, at said secondary bit rate, parallel to said first transmission channel, according to said primary bit rate, within said first section, and said first switching operation (29) is carried out directly within said second section (36).

14. A method according to claim 11, characterized in that, before said second switching operation (211), a synchronization signal is sent from the end of said first section (34) that is closest to said second section (36) to the other end of said first section (34), so that said first and second ends of said first section (34) perform said second switching operation (211) at the same instant.

15. A method according to claim 2, characterized in that said modems work according to the V25 recommendation.

16. A method according to claim 1, characterized in that said switching phase furthermore comprises a step (28) for the deactivation of the echo suppressors and cancellers and said step (28) of deactivation complies with the G164 and G165 recommendations.

17. A method according to claim 1, characterized in that at least one of the following conditions is met:

said step (411) for the detection of said response signal takes place before the end of a period (421) of detection of said predetermined maximum response signal;

said step (412) for the detection of a first phase reversal of said response signal takes place before the end of a period (422) of detection of a first phase reversal of said predetermined maximum response signal;

said step (413) of detection of a second phase reversal of said response signal takes place before the end of a period (423) of detection of a second phase reversal of said predetermined response signal.

18. A method according to claim 17, characterized in that said method complies with at least one of the following approximate temporal values:

said period (431) of masking of said predetermined acknowledgment signal is equal to at most about 2.6 seconds starting from said sending of said response signal;

said period (421) of detection of said predetermined response signal is equal to at most about 200 ms starting from said sending of said response signal;

said period (422) of detection of said first phase reversal of said predetermined response signal is equal to at most about 675 ms starting from said sending of said response signal;

said period (423) of detection of said second phase reversal of said predetermined response signal is equal to at most about 475 ms starting from said detection (412) of said first phase reversal of said response signal;

said first predetermined threshold is equal at most to about 100 ms;

said second predetermined threshold is equal at most to about 55 ms.

19. A method according to claim 1, characterized in that said secondary bit rate is higher than said primary bit rate.

20. A method according to claim 1, characterized in that said secondary bit rate is 64 kbit/s and said primary bit rate is 32 kbit/s.

21. A method according to claim 8, characterized in that said central module (33) consists of a central communications station managing the transfer of all the calls, said remote module (37) is a terminal station and said central module (33) and said remote module (37) are connected through a peripheral module (35), said peripheral module (35) being constituted by a peripheral communications station providing for the interconnection and matching of the exchanged data, during calls between said first and second sections (36).

22. A method according to claim 1, characterized in that said method furthermore comprises at least some of the following steps:
- the stopping (422) of the transcoding of the data transmitted between said central module (33) and said remote module (37) from a PCM encoding technique to an ADPCM coding technique within said first section (34) and/or said second section (36);
- the unmasking of said acknowledgment signal sent by said calling module;
- the releasing (433, 442) of the physical resources of said first primary bit-rate transmission channel connected to said first section (34) and/or said second section (36).

23. A transmission network comprising a section (34, 36) of a transmission network implementing a method (10) for setting up a call according to claim 1.

24. A method for setting up a call with bit-rate allocation in a multiple bit-rate transmission channel enabling a call to be conveyed between a central module (33) and a remote module (37), said multiple bit-rate transmission channel comprising at least one first transmission channel according to a primary bit rate and at least one second transmission channel according to a secondary bit rate that is distinct from said primary bit rate, said method being designed to be implemented notably to convey a call between a calling module and a called module, said call being set up according to a setting-up process comprising the following steps:
- a first step (11) for the sending of a call signal by said calling module;
- a second step (12) for the sending of a response signal by said called module;
- a third step for the sending, by said calling module, of a signal of acknowledgment of said response signal;
- a fourth step (18) for the negotiation of transmission characteristics between said calling and called modules;

said method further comprises the following steps:
- a phase for the setting up by default of said call on a first primary bit-rate transmission channel;
- a phase (13) of listening and searching for a signal indicating a secondary bit-rate requirement;

and, assuming a detection of said signal indicating a secondary bit-rate requirement,
- a phase (110) for the switching of a bit rate from said first primary bit-rate transmission channel to said secondary bit-rate transmission channel, said bit-rate switching phase (110) being associated with a step (111) of masking of said acknowledgment signal for a predetermined masking period (431), characterized in that said masking step (111) of said acknowledgment signal is implemented within a transmission system (30) comprising at least two sections called first (34) and second (36) sections, and characterized in that said switching phase (110) comprises the following successive operations:
- the first switching (29) of said second section (36), from said first primary bit-rate transmission channel to said second secondary bit-rate transmission channel;
- the synchronous second switching (211) of the two ends of said first section (34) from said first primary bit-rate transmission channel to said second secondary bit-rate transmission channel.

25. A method for setting up a call with bit-rate allocation in a multiple bit-rate transmission channel enabling a call to be conveyed between a central module (33) and a remote module (37), said multiple bit-rate transmission channel comprising at least one first transmission channel according to a primary bit rate and at least one second transmission channel according to a secondary bit rate that is distinct from said primary bit rate, said method being designed to be implemented notably to convey a call between a calling module and a called module, said call being set up according to a setting-up process comprising the following steps:
- a first step (11) for the sending of a call signal by said calling module;
- a second step (12) for the sending of a response signal by said called module;
- a third step for the sending, by said calling module, of a signal of acknowledgment of said response signal;
- a fourth step (18) for the negotiation of transmission characteristics between said calling and called modules;

said method further comprises the following steps:
- a phase for the setting up by default of said call on a first primary bit-rate transmission channel;
- a phase (13) of listening and searching for a signal indicating a secondary bit-rate requirement;

and, assuming a detection of said signal indicating a secondary bit-rate requirement,
- a phase (110) for the switching of a bit rate from said first primary bit-rate transmission channel to said secondary bit-rate transmission channel, said bit-rate switching phase (110) being associated with a step (111) of masking of said acknowledgment signal for a predetermined masking period (431), characterized in that at least one of the following conditions is met:
- said step (411) for the detection of said response signal takes place before the end of a period (421) of detection of said predetermined maximum response signal;
- said step (412) for the detection of a first phase reversal of said response signal takes place before the end of a period (422) of detection of a first phase reversal of said predetermined maximum response signal;
- said step (413) of detection of a second phase reversal of said response signal takes place before the end of a period (423) of detection of a second phase reversal of said predetermined response signal.

* * * * *